United States Patent
Yang (10) Patent No.: US 12,317,123 B2
(45) Date of Patent: May 27, 2025

(54) METHOD AND APPARATUS FOR DETERMINING RADIO RESOURCE

(71) Applicant: XIAOMI COMMUNICATIONS CO., LTD., Beijing (CN)

(72) Inventor: Xing Yang, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 393 days.

(21) Appl. No.: 17/596,909

(22) PCT Filed: Jun. 25, 2019

(86) PCT No.: PCT/CN2019/092854
§ 371 (c)(1),
(2) Date: Dec. 21, 2021

(87) PCT Pub. No.: WO2020/258050
PCT Pub. Date: Dec. 30, 2020

(65) Prior Publication Data
US 2022/0322134 A1  Oct. 6, 2022

(51) Int. Cl.
*H04W 28/02* (2009.01)
*H04W 88/06* (2009.01)

(52) U.S. Cl.
CPC ........ *H04W 28/0268* (2013.01); *H04W 88/06* (2013.01)

(58) Field of Classification Search
CPC . H04W 28/0268; H04W 88/06; H04W 28/04; H04W 36/14; H04W 36/30
See application file for complete search history.

(56) References Cited

U.S. PATENT DOCUMENTS

| | | | |
|---|---|---|---|
| 6,594,240 B1 * | 7/2003 | Chuah | H04W 74/0875 370/328 |
| 9,078,265 B2 * | 7/2015 | Harnay | H04W 72/51 |
| 9,980,275 B2 * | 5/2018 | Goel | H04W 68/02 |
| 11,576,181 B2 * | 2/2023 | Cai | H04W 28/0268 |
| 2009/0156256 A1 * | 6/2009 | Shi | H04W 60/02 455/558 |
| 2009/0156257 A1 * | 6/2009 | Shi | H04W 48/12 455/558 |
| 2009/0215472 A1 * | 8/2009 | Hsu | H04W 8/183 455/458 |

(Continued)

FOREIGN PATENT DOCUMENTS

| | | | | |
|---|---|---|---|---|
| CA | 2808444 A1 * | 3/2012 | | H04B 7/26 |
| CN | 101179796 A | 5/2008 | | |

(Continued)

OTHER PUBLICATIONS

International Search Report in the international application No. PCT/CN2019/092854, mailed on Mar. 23, 2020.

(Continued)

*Primary Examiner* — Yuwen Pan
*Assistant Examiner* — Swati Jain
(74) *Attorney, Agent, or Firm* — Syncoda LLC; Feng Ma (57) ABSTRACT

A method for determining a radio resource includes: a first target network is determined from a plurality of networks when a terminal simultaneously accesses the plurality of networks through a plurality of Subscriber Identification Module (SIM) cards; and data scheduling is performed on a radio resource of the first target network if the plurality of networks have a data scheduling conflict on a same radio resource.

6 Claims, 4 Drawing Sheets

(56) References Cited

U.S. PATENT DOCUMENTS

| | | | | |
|---|---|---|---|---|
| 2010/0008224 | A1* | 1/2010 | Lyonnet | H04L 47/2441 |
| | | | | 370/231 |
| 2010/0099412 | A1* | 4/2010 | Ramachandran | H04W 48/18 |
| | | | | 455/435.2 |
| 2010/0322069 | A1* | 12/2010 | Song | H04W 28/24 |
| | | | | 370/229 |
| 2011/0201336 | A1* | 8/2011 | Garrett | H04W 36/0066 |
| | | | | 455/436 |
| 2011/0286344 | A1* | 11/2011 | Hanaoka | H04W 36/26 |
| | | | | 370/252 |
| 2015/0003243 | A1* | 1/2015 | Klingenbrunn | H04W 36/26 |
| | | | | 370/230 |
| 2015/0131545 | A1* | 5/2015 | Ameigeiras Gutierrez | |
| | | | | H04W 72/23 |
| | | | | 370/329 |
| 2015/0257024 | A1* | 9/2015 | Baid | H04W 76/22 |
| | | | | 370/338 |
| 2015/0334157 | A1* | 11/2015 | Oyman | H04L 41/0659 |
| | | | | 709/219 |
| 2016/0044567 | A1* | 2/2016 | Baghel | H04W 4/24 |
| | | | | 370/331 |
| 2016/0112578 | A1* | 4/2016 | Yang | H04M 15/7556 |
| | | | | 455/432.1 |
| 2016/0295550 | A1* | 10/2016 | Sharma | H04W 48/20 |
| 2017/0257886 | A1* | 9/2017 | Adjakple | H04W 74/04 |
| 2019/0327656 | A1* | 10/2019 | Han | H04W 36/0064 |
| 2020/0396714 | A1* | 12/2020 | Lee | H04W 52/0229 |
| 2021/0160763 | A1* | 5/2021 | Lou | H04W 28/0289 |
| 2021/0219289 | A1* | 7/2021 | Lin | H04W 72/23 |
| 2021/0368347 | A1* | 11/2021 | Wang | H04W 16/04 |
| 2024/0224280 | A1* | 7/2024 | Zhao | H04W 52/367 |

FOREIGN PATENT DOCUMENTS

| | | | | |
|---|---|---|---|---|
| CN | 101184292 | A | | 5/2008 |
| CN | 101203005 | A | | 6/2008 |
| CN | 101217738 | A | | 7/2008 |
| CN | 101951287 | A | | 1/2011 |
| CN | 102256338 | A | | 11/2011 |
| CN | 102355704 | A | | 2/2012 |
| CN | 102883471 | A | | 1/2013 |
| CN | 103379468 | A | | 10/2013 |
| CN | 103391640 | A | | 11/2013 |
| CN | 104144406 | A | * | 11/2014 |
| CN | 104144528 | A | | 11/2014 |
| CN | 105744060 | A | | 7/2016 |
| CN | 106060794 | A | | 10/2016 |
| CN | 107548114 | A | * | 1/2018 |
| CN | 108207032 | A | | 6/2018 |
| CN | 109845312 | A | | 6/2019 |
| WO | 2012072463 | A1 | | 6/2012 |

OTHER PUBLICATIONS

English translation of the Written Opinion of the International Search Authority in the international application No. PCT/CN2019/092854, mailed on Mar. 23, 2020.

Zhao Jianchuan, Duan Hongguang, Switching process of the primary and secondary cards of dual cards two standby mobile terminal, Digital Communications vol. 40, No. 6, Dec. 25, 2013.

First Office Action of Chinese Patent Application No. 201980001143.5, issued on May 6, 2022.

* cited by examiner

METHOD AND APPARATUS FOR DETERMINING RADIO RESOURCE

CROSS-REFERENCE TO RELATED APPLICATION

This application is a U.S. national phase of International Application No. PCT/CN2019/092854, filed with the State Intellectual Property Office of P. R. China on Jun. 25, 2019, the entire content of which is incorporated herein by reference for all purposes.

BACKGROUND

At present, there are more and more terminals supporting a plurality of Subscriber Identification Module (SIM) cards. If the plurality of SIM cards belong to different operators, a terminal can access the networks of a plurality of operators simultaneously. There is no interface among networks of different operators.

If the terminal supporting the plurality of SIM cards cannot support the interaction with a plurality of networks simultaneously, then the terminal will perform data scheduling on only one network and perform no data scheduling on other networks when there is a conflict among the plurality of networks in scheduling a resource. If the currently scheduled service on other networks is more important, it will cause the failure of the important service.

SUMMARY

To resolve the problem in the related art, embodiments of the disclosure provide a method and an apparatus for determining a radio resource.

According to a first aspect of embodiments of the disclosure, a method for determining a radio resource is provided. The method is applied to a terminal supporting a plurality of SIM cards belonging to different operators. The method may include: determining a first target network from a plurality of networks when the terminal simultaneously accesses the plurality of networks through the plurality of SIM cards; and performing data scheduling on a radio resource of the first target network in response to determining that the plurality of networks have a data scheduling conflict on a same radio resource.

According to a second aspect of embodiments of the disclosure, a method for determining a radio resource is provided. The method is applied to a terminal supporting a plurality of SIM cards belonging to different operators. The method may include: determining a second target network from a plurality of networks in response to determining that the plurality of networks have a data scheduling conflict on a same radio resource after the terminal simultaneously accesses the plurality of networks through the plurality of SIM cards; and performing data scheduling on a radio resource of the second target network.

According to a third aspect of embodiments of the disclosure, an apparatus for determining a radio resource is provided. The apparatus is a terminal supporting a plurality of SIM cards belonging to different operators, and includes: a processor and a memory configured to store instructions executable by the processor. The processor may be configured to: determine a first target network from a plurality of networks when the terminal simultaneously accesses the plurality of networks through the plurality of SIM cards; and perform data scheduling on a radio resource of the first target network in response to determining that the plurality of networks have a data scheduling conflict on a same radio resource.

It is to be understood that the above general description and the following detailed description are only intended to be illustrative and not restrictive, but cannot limit the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the disclosure.

DETAILED DESCRIPTION

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with the disclosure. On the contrary, they are only examples of apparatuses and methods that are described in the appended claims in detail and that are consistent with some aspects of the disclosure.

The terms used the disclosure are merely for the purpose of illustrating specific embodiments, and are not intended to limit the disclosure. The terms "a", "the" and "this" of singular forms used in the disclosure and the appended claims are also intended to include plural forms, unless otherwise specified in the context clearly. It is also to be understood that the term "and/or" used herein includes any and all combinations of one or more of the associated listed items.

It is to be understood that, although the terms first, second, third, etc. may be configured to describe various information in the disclosure, such information should not be limited to these terms. These terms are only used to distinguish the same type of information from one another. For example, without departing from the scope of the disclosure, first information may also be referred to as second information, and similarly, the second information may also be referred to as the first information. Depending on the context, the words "in case of" and "if" as used herein can be interpreted as "when" or "at the time that" or "in response to determining".

Embodiments of the disclosure provide a method for determining a radio resource, which can be applied to a terminal supporting a plurality of SIM cards belonging to different operators in a 5th-Generation (5 G) scenario. Optionally, the terminal accesses a plurality of networks through a plurality of SIM cards. If the plurality of networks have a data scheduling conflict on the same radio resource, then the terminal may determine a network for performing data scheduling in any of the following modes.

In a first mode, a first target network is determined from a plurality of networks when the terminal simultaneously accesses the plurality of networks through the plurality of SIM cards.

Subsequently, if the plurality of networks have a data scheduling conflict on the same radio resource, then data scheduling is only performed on the radio resource of the first target network.

In a second mode, after a terminal simultaneously accesses a plurality of networks through the plurality of SIM cards, a second target network is only dynamically determined from the plurality of networks when the plurality of networks have a data scheduling conflict on the same radio resource.

Thus, once the plurality of networks have a data scheduling conflict on the same radio resource, then the data scheduling may be performed on the radio resource of the second target network.

Through the above modes, the purposes of reasonably selecting the radio resource and ensuring the transmission of a more important service can be achieved.

The above first mode is introduced below first.

Figure 1:
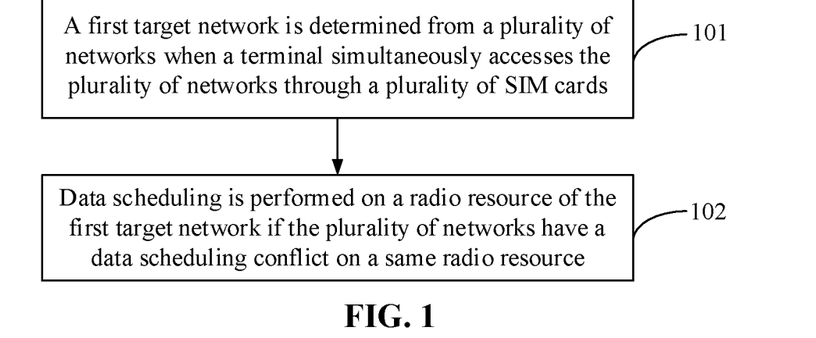
FIG. 1 is a schematic flowchart of a method for determining a radio resource, according to an exemplary embodiment.

Referring to FIG. 1, FIG. 1 is a schematic flowchart of a method for determining a radio resource according to an embodiment, the method may include the following steps.

At step S101, a first target network is determined from a plurality of networks when a terminal simultaneously accesses the plurality of networks through a plurality of SIM cards.

At this step, a network may be determined as the first target network from the plurality of networks by the terminal when the terminal simultaneously accesses the plurality of networks through a plurality of SIM cards.

At step S102, data scheduling is performed on a radio resource of the first target network if the plurality of networks have a data scheduling conflict on a same radio resource.

At this step, once the plurality of networks perform data receiving or transmitting on the same radio resource, then the terminal determines that the plurality of networks have the data scheduling conflict on the same radio resource. At this time, the terminal may perform the data receiving or transmitting only on the radio resource of the first target network. Optionally, the radio resource includes, but not limited to, a time domain resource, a frequency domain resource, a beam resource, and the like.

In the above embodiments, the radio resource may be selected reasonably when the terminal simultaneously accessing the plurality of networks has a data scheduling conflict on the same radio resource, so as to achieve the purpose of ensuring the transmission of a more important service.

In an embodiment, at the above step S101, the terminal may select a network from the plurality of networks and determine the network as the first target network when the first target network is determined from the plurality of networks.

In an embodiment, a network may also be selected from the plurality of networks by a user according to its own service needs, and the network determined by the user is taken as the first target network by the terminal when a first target network is determined from a plurality of networks.

In the above embodiments, when a first target network is determined from a plurality of networks, a network may be determined as the first target network from the plurality of networks by a terminal; or, a network may also be determined from the plurality of networks by a user according to its own service needs, and the network determined by the user is taken as the first target network by the terminal. This facilitates subsequent guarantee of the transmission of a more important service, and the availability is high.

The above second mode is then introduced below.

Figure 2:
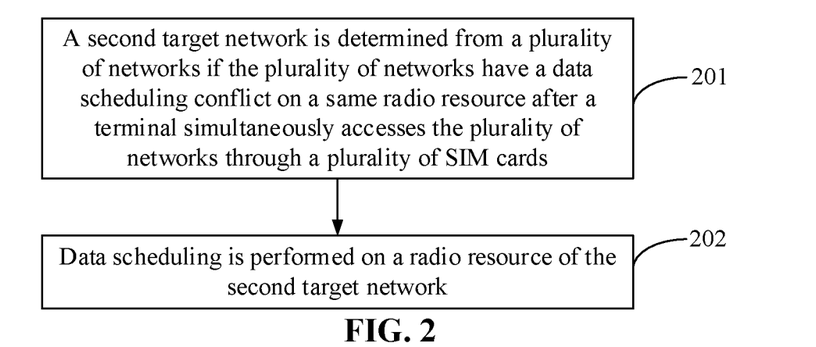
FIG. 2 is a schematic flowchart of another method for determining a radio resource, according to an exemplary embodiment.

Referring to FIG. 2, FIG. 2 is a schematic flowchart of another method for determining a radio resource according to an embodiment, the method may include the following steps.

At step S201, a second target network is determined from a plurality of networks if the plurality of networks have a data scheduling conflict on a same radio resource after a terminal simultaneously accesses the plurality of networks through a plurality of SIM cards.

At this step, when the terminal simultaneously accesses the plurality of networks through the plurality of SIM cards, the terminal does not determine the first target network, but dynamically determines a second target network from the plurality of networks when the plurality of networks have a data scheduling conflict on the same radio resource, for example, the plurality of networks need to perform data receiving or transmitting simultaneously on the same radio resource.

Optionally, the radio resource includes, but not limited to, a time domain resource, a frequency domain resource, a beam resource, and the like.

At step S202, data scheduling is performed on a radio resource of the second target network.

At this step, the terminal performs the data scheduling, i.e., performs data receiving or transmitting, only on the radio resource of the second target network.

In the above embodiments, the second target network may also be dynamically determined from the plurality of networks if the plurality of networks have a data scheduling conflict on the same radio resource after the terminal simultaneously accesses the plurality of networks through a plurality of SIM cards of different operators, so that the data scheduling is performed on the radio resource of the second target network. Through the above process, a radio resource may be selected reasonably when the terminal that simultaneously accesses the plurality of networks has a data scheduling conflict on the same radio resource, which also achieves the purpose of ensuring the transmission of a more important service.

In an embodiment, the second target network may be determined from the plurality of networks by the terminal according to a QCI of a logical channel included in each of the plurality of networks. Optionally, the QCI involved in the embodiments of the disclosure may be a QoS Class Identifier (QCI) configured to measure the QoS of a logical channel in a Long Term Evolution (LTE) system, or the QCI involved in the embodiments of the disclosure may also be a 5 G QoS indicator (5 QI) in a 5G system.

In the above embodiments, the second target network may be dynamically determined from the plurality of networks by the terminal according to the QCI of the logical channel of each network, so that a network with higher QCI may be taken as the second target network. Once the plurality of networks have the data scheduling conflict on the same radio resource, then the radio resource may be selected reasonably, which achieves the purpose of ensuring the transmission of a more important service.

Figure 3:
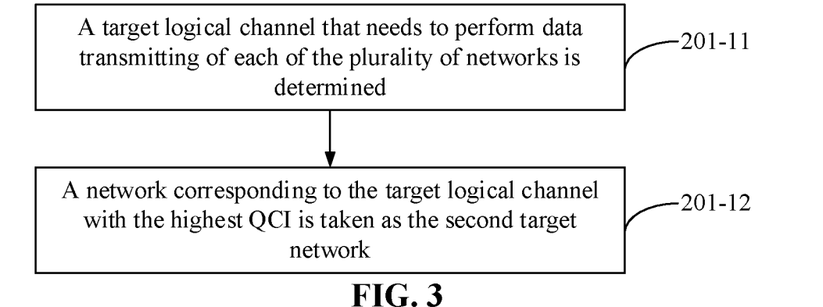
FIG. 3 is a schematic flowchart of another method for determining a radio resource, according to an exemplary embodiment.

In an embodiment, if the plurality of networks have an uplink data scheduling conflict on the same radio resource, that is to say, the plurality of networks perform data transmitting on the same radio resource, referring to FIG. 3, which is a schematic flowchart of another method for determining a radio resource according to an embodiment shown in FIG. 2, step S201 may include the following operations.

At step S201-11, a target logical channel that needs to perform data transmitting of each of the plurality of networks is determined.

At this step, assuming that a network A includes a logical channel A1 and a logical channel A2, and a network B includes a logical channel B1 and a logical channel B2, at this moment, the terminal needs to be on the same radio resource, and both the logical channel A1 and the logical channel B1 have data to be transmitted, then the terminal may take the logical channel A1 as a target logical channel of the network A, and the logical channel B1 as a target logical channel of the network B.

At step S201-12, a network corresponding to the target logical channel with the highest QCI is taken as the second target network.

At this step, the 5 QI of the logical channel A1 of the network A is 4, and the 5 QI of the logical channel B1 of the network B is 3. The network corresponding to the target logical channel with the highest QCI is taken as the second target network by the terminal, that is, the network A is taken as the second target network. The terminal performs data transmitting on the radio resource of the network A subsequently.

In the above embodiments, if the plurality of networks have an uplink data scheduling conflict on the same radio resource, then the terminal may determine a target logical channel that needs to perform data transmitting of each of the plurality of networks first, and select the network corresponding to the target logical channel with the highest QCI as the second target network. Through the above process, the network corresponding to the target logical channel with the highest QCI may be selected as the second target network when the plurality of networks have the uplink data scheduling conflict on the same radio resource, so that the service transmission quality is ensured, and the availability is high.

Figure 4:
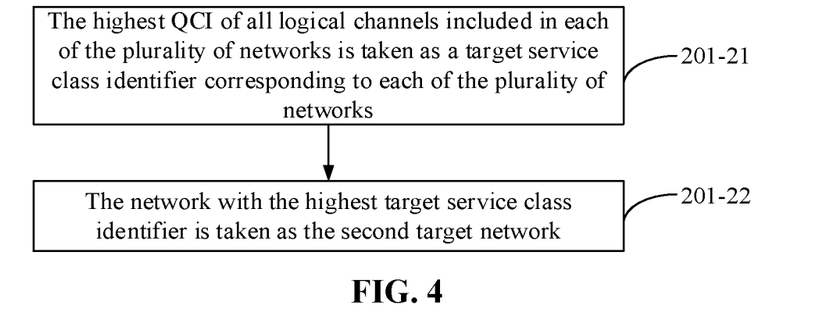
FIG. 4 is a schematic flowchart of another method for determining a radio resource, according to an exemplary embodiment.

In an embodiment, if the plurality of networks have a downlink data scheduling conflict on the same radio resource, that is to say, the plurality of networks perform data receiving on the same radio resource, referring to FIG. 4, which is a schematic flowchart of another method for determining a radio resource according to an embodiment shown in FIG. 3, step S201 may include the following operation.

At step S201-21, the highest QCI of all logical channels included in each of the plurality of networks is taken as a target service class identifier corresponding to each of the plurality of networks.

At this step, assuming that a network A includes a logical channel A1 and a logical channel A2, the 5 QI of the logical channel A1 is 4, and the 5 QI of the logical channel A2 is 2. A network B includes a logical channel B1 and a logical channel B2, the 5 QI of the logical channel B1 is 3, and the 5 QI of the logical channel B2 is 5.

The terminal may determine that the target service class identifier corresponding to the network A is 4, and the target service class identifier corresponding to the network B is 5.

At step S201-22, the network with the highest target service class identifier is taken as the second target network.

In the embodiments of the disclosure, assuming that the target service class identifier corresponding to the network A is 4, and the target service class identifier corresponding to the network B is 5, then the terminal may take the network B as the second target network. The terminal performs data receiving on the radio resource of the network B subsequently.

In the above embodiments, the terminal may take the highest QCI of all logical channels included in each of the networks as the target service class identifier of each network if the plurality of networks have a downlink data scheduling conflict on the same radio resource, and further, the network with the highest target service class identifier is taken as the second target network. Through the above process, the network with the highest target service class identifier may be selected as the second target network when the plurality of networks have the downlink data scheduling conflict on the same radio resource, so that the service transmission quality is ensured, and the availability is high.

Corresponding to the above application function implementing method embodiments, the disclosure further provides embodiments of an application function implementing apparatus and a corresponding terminal.

Figure 5:
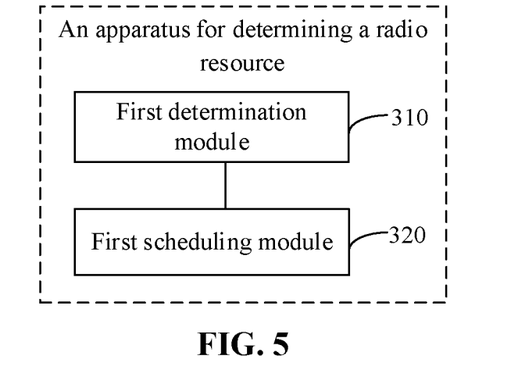
FIG. 5 is a block diagram of an apparatus for determining a radio resource, according to an exemplary embodiment.

FIG. 5 is a block diagram of an apparatus for determining a radio resource according to an embodiment. The apparatus is applied to a terminal supporting a plurality of SIM cards, and includes a first determination module 310 and a first scheduling module 320.

The first determination module 310 is configured to determine a first target network from a plurality of networks when the terminal simultaneously accesses the plurality of networks through the plurality of SIM cards.

The first scheduling module 320 is configured to perform data scheduling on a radio resource of the first target network if the plurality of networks have a data scheduling conflict on a same radio resource.

Figure 6:
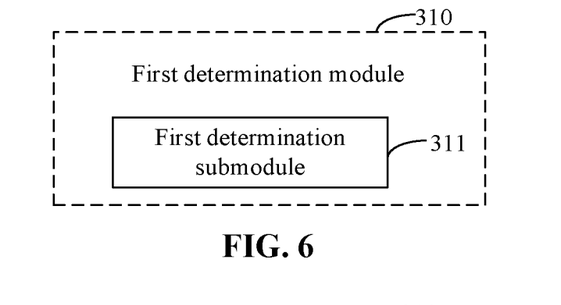
FIG. 6 is a block diagram of another apparatus for determining a radio resource, according to an exemplary embodiment.

Referring to FIG. 6, FIG. 6 is a block diagram of another apparatus for determining a radio resource on the basis of the embodiment shown in FIG. 5, and the first determination module 310 includes a first determination submodule 311.

The first determination submodule 311 is configured to determine a network from the plurality of networks as the first target network by the terminal.

Figure 7:
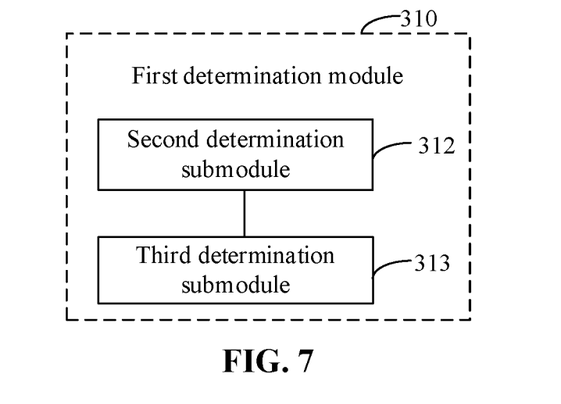
FIG. 7 is a block diagram of another apparatus for determining a radio resource, according to an exemplary embodiment.

Referring to FIG. 7, FIG. 7 is a block diagram of another apparatus for determining a radio resource on the basis of the embodiment shown in FIG. 5, and the first determination module 310 includes a second determination submodule 312 and a third determination submodule 313.

The second determination submodule 312 is configured to determine a network from the plurality of networks by a user.

The third determination submodule 313 is configured to take the network determined by the user as the first target network by the terminal.

Figure 8:
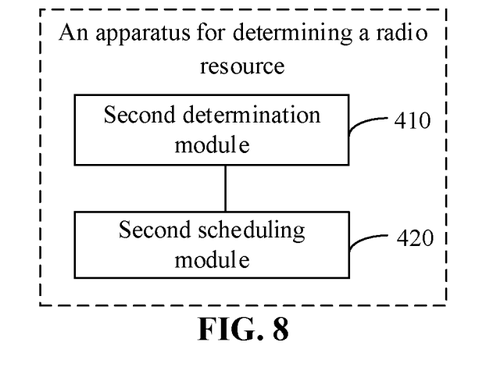
FIG. 8 is a block diagram of another apparatus for determining a radio resource, according to an exemplary embodiment.

Referring to FIG. 8, FIG. 8 is a block diagram of another apparatus for determining a radio resource according to an exemplary embodiment. The apparatus is applied to a terminal supporting a plurality of SIM cards belonging to different operators, and includes a second determination module 410 and a second scheduling module 420.

The second determination module 410 is configured to determine a second target network from a plurality of networks if the plurality of networks have a data scheduling conflict on a same radio resource after the terminal simultaneously accesses the plurality of networks through the plurality of SIM cards.

The second scheduling module 420 is configured to perform data scheduling on a radio resource of the second target network.

Figure 9:
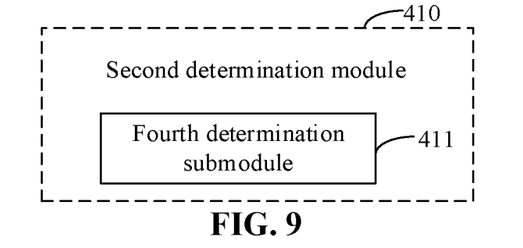
FIG. 9 is a block diagram of another apparatus for determining a radio resource, according to an exemplary embodiment.

Referring to FIG. 9, FIG. 9 is a block diagram of another apparatus for determining a radio resource on the basis of the embodiment shown in FIG. 8, and the second determination module 410 includes a fourth determination submodule 411.

The fourth determination submodule 411 is configured to determine the second target network from the plurality of networks according to a QCI of a logical channel included in each of the plurality of networks.

Figure 10:
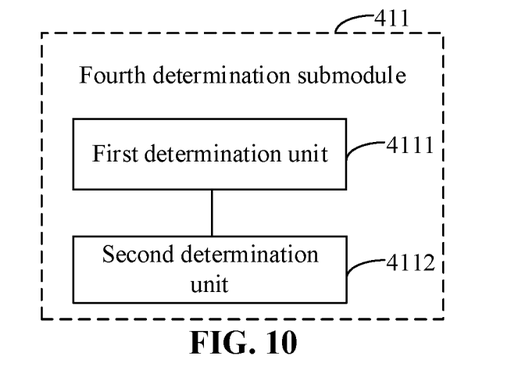
FIG. 10 is a block diagram of another apparatus for determining a radio resource, according to an exemplary embodiment.

Referring to FIG. 10, FIG. 10 is a block diagram of another apparatus for determining a radio resource on the basis of the embodiment shown in FIG. 9, and the fourth determination submodule 411 includes a first determination unit 4111 and a second determination unit 4112.

The first determination unit 4111 is configured to determine a target logical channel that needs to perform data transmitting of each of the plurality of networks.

The second determination unit 4112 is configured to take a network corresponding to the target logical channel with the highest QCI as the second target network.

Figure 11:
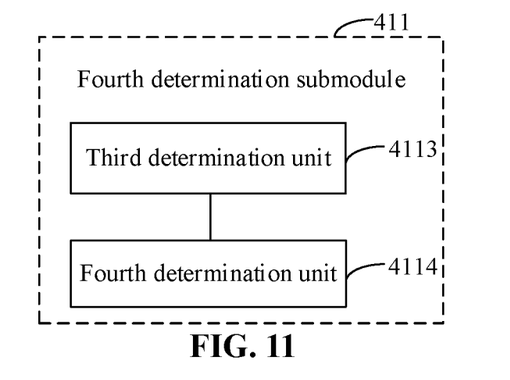
FIG. 11 is a block diagram of another apparatus for determining a radio resource, according to an exemplary embodiment.

Referring to FIG. 11, FIG. 11 is a block diagram of another apparatus for determining a radio resource on the basis of the embodiment shown in FIG. 9, and the fourth determination submodule 411 includes a third determination unit 4113 and a fourth determination unit 4114.

The third determination unit 4113 is configured to take the highest QCI of all logical channels included in each network as a target service class identifier corresponding to each network.

The fourth determination unit 4114 is configured to take the network with the highest target service class identifier as the second target network.

For the apparatus embodiments, since they are basically corresponding to the method embodiments, relevant parts can be referred to the description of the method embodiments. The above device embodiment is merely schematic. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the disclosure. Those skilled in the art may understand and implement the disclosure without creative work.

Correspondingly, the disclosure further provides a computer-readable storage medium. The storage medium stores a computer program, and the computer program is configured to perform the method for determining the radio resource according to the first mode mentioned above.

Correspondingly, the disclosure further provides a computer-readable storage medium. The storage medium stores a computer program, and the computer program is configured to perform the method for determining the radio resource according to the second mode mentioned above.

Correspondingly, the disclosure further provides an apparatus for determining a radio resource. The apparatus is applied to a terminal supporting a plurality of SIM cards belonging to different operators, and includes: a processor and a memory configured to store instructions executable by the processor.

The processor is configured to: determine a first target network from a plurality of networks when the terminal simultaneously accesses the plurality of networks through the plurality of SIM cards; and perform data scheduling on a radio resource of the first target network if the plurality of networks have a data scheduling conflict on a same radio resource.

Correspondingly, the disclosure further provides an apparatus for determining a radio resource. The apparatus is applied to a terminal supporting a plurality of SIM cards belonging to different operators, and includes: a processor and a memory configured to store instructions executable by the processor.

The processor is configured to: determine a second target network from a plurality of networks if the plurality of networks have a data scheduling conflict on a same radio resource after the terminal simultaneously accesses the plurality of networks through the plurality of SIM cards; and perform data scheduling on a radio resource of the second target network.

Figure 12:
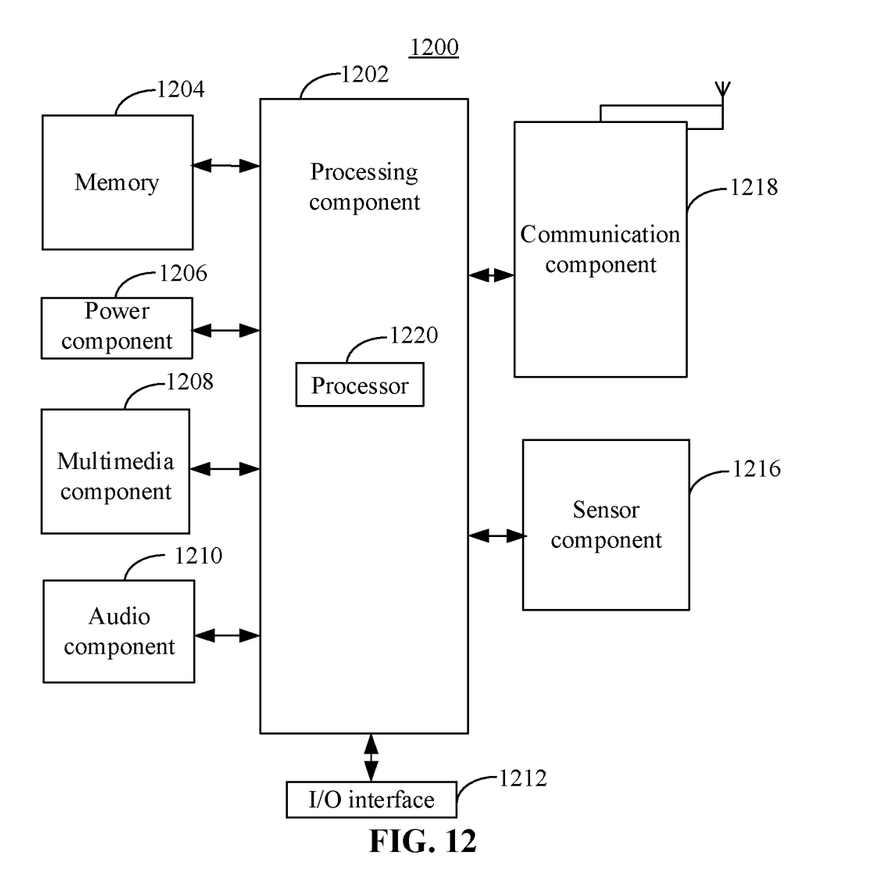
FIG. 12 is a structural schematic diagram of an apparatus for determining a radio resource, according to an exemplary embodiment.

FIG. 12 is a block diagram of an electronic device 1200 supporting a plurality of SIM cards according to an exemplary embodiment. For example, the electronic device 1200 may be a mobile phone, a tablet computer, an e-book reader, a multimedia playback device, a wearable device, a vehicle terminal, and the like.

Referring to FIG. 12, the electronic device 1200 may include one or more of the following components: a processing component 1202, a memory 1204, a power component 1206, a multimedia component 1208, an audio component 1210, an Input/Output (I/O) interface 1212, a sensor component 1216, or a communication component 1218.

The processing component 1202 typically controls overall operations of the electronic device 1200, such as the operations associated with display, telephone calls, data communications, camera operations, and recording operations. The processing component 1202 may include one or more processors 1220 to execute instructions to perform all or part of the steps in the above method. Moreover, the processing component 1202 may include one or more modules which facilitate interaction between the processing component 1202 and other components. For example, the processing component 1202 may include a multimedia module to facilitate interaction between the multimedia component 1208 and the processing component 1202. For another example, the processing component 1202 may read executable instructions from the memory to implement the steps of a method for determining a radio resource provided by each of the above embodiments.

The memory 1204 is configured to store various types of data to support the operation of the electronic device 1200.

Examples of such data include instructions for any applications or methods operated on the electronic device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or compact disk.

The power component 1206 provides power for various components of the electronic device 1200. The power component 1206 may include a power management system, one or more power supplies, and other components associated with generation, management, and distribution of power for the electronic device 1200.

The multimedia component 1208 includes a display screen providing an output interface between the electronic device 1200 and a user. In some embodiments, the multimedia component 1208 includes a front camera and/or a rear camera. A front camera and/or a rear camera may receive external multimedia data when the electronic device 1200 is in an operation mode, for example, a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the electronic device 1200 is in an operation mode, such as a call mode, a recording mode and a voice recognition mode. The received audio signal may further be stored in the memory 1204 or sent through the communication component 1218. In some embodiments, the audio component 1210 further includes a speaker configured to output the audio signal.

The I/O interface 1212 provides an interface between the processing component 1202 and peripheral interface modules, such as a keyboard, a click wheel, buttons and the like. The buttons may include, but are not limited to: a home button, a volume button, a starting button and a locking button.

The sensor component 1216 includes one or more sensors configured to provide status assessments in various aspects for the electronic device 1200. For example, the sensor component 1216 may detect an on/off state of the electronic device 1200 and relative positioning of components. For example, the components are a display and a small keyboard of the electronic device 1200. The sensor component 1216 may also detect a change in a position of the electronic device 1200 or a component of the electronic device 1200, presence or absence of contact between the user and the electronic device 1200, orientation or acceleration/deceleration of the electronic device 1200 and a change in temperature of the electronic device 1200. The sensor component 1216 may include a proximity sensor configured to detect presence of an object nearby without any physical contact. The sensor component 1216 may also include a light sensor, such as a Complementary Metal Oxide Semiconductor (CMOS) or Charge Coupled Device (CCD) image sensor, configured for use in an imaging application. In some embodiments, the sensor component 12186 may also include an acceleration sensor, a gyroscope sensor, a magnetic sensor, a pressure sensor, or a temperature sensor.

The communication component 1218 is configured to facilitate wired or wireless communication between the electronic device 1200 and other devices. The electronic device 1200 may access a communication-standard-based wireless network, such as a Wireless Fidelity (Wi-Fi) network, a 2nd-Generation (2 G), a 3rd-Generation (3G) network, a 4th-Generation (4G) network, 5th-Generation (5G) network, or a combination thereof. In an exemplary embodiment, the communication component 1218 receives a broadcast signal or broadcast associated information from an external broadcast management system through a broadcast channel. In an exemplary embodiment, the communication component 1218 further includes a Near Field Communication (NFC) module to facilitate short-range communications. For example, the NFC module may be implemented based on a Radio Frequency Identification (RFID) technology, an Infrared Data Association (IrDA) technology, an Ultra Wide Band (UWB) technology, a Bluetooth (BT) technology, and another technology.

In an exemplary embodiment, the electronic device 1200 may be implemented by one or more ASICs (Application Specific Integrated Circuits), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, and is configured to execute the above method.

In an exemplary embodiment, there is also provided a non-transitory computer-readable storage medium including instructions, such as included in the memory 1204, executable by the processor 1220 of the electronic device 1200 for performing the above wireless charging method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

Other implementation solutions of the disclosure will be apparent to those skilled in the art after considering the specification and practicing the disclosure herein. The disclosure is intended to cover any variations, uses, or adaptations of the disclosure following the general principles thereof and including such departures from the disclosure as come within known or customary technical means in the art. The specification and embodiments are to be regarded as illustrative only, and the true scope and spirit of the disclosure are pointed out by the following claims.

In the embodiments of the disclosure, when a first target network is determined from a plurality of networks, a network may be determined from the plurality of networks as the first target network by a terminal; or a network may be determined from the plurality of networks by a user, and the network determined by the user is taken as the first target network by the terminal. This facilitates subsequent guarantee of the transmission of a more important service, and the availability is high.

In the embodiments of the disclosure, a second target network may also be dynamically determined from the plurality of networks if the plurality of networks have a data scheduling conflict on the same radio resource after the terminal simultaneously accesses the plurality of networks through a plurality of SIM cards, so that data scheduling is performed on the radio resource of the second target network. Through the above process, a radio resource may be selected reasonably when the terminal that simultaneously accesses the plurality of networks has a data scheduling conflict on the same radio resource, which also achieves the purpose of ensuring the transmission of a more important service.

In the embodiments of the disclosure, the second target network may be dynamically determined from the plurality of networks by the terminal according to the QCI of the logical channel of each network, so that the network with higher QCI may be taken as the second target network. Once the plurality of networks have the data scheduling conflict on the same radio resource, then the radio resource may be selected reasonably, which achieves the purpose of ensuring the transmission of a more important service.

In the embodiments of the disclosure, if the plurality of networks have an uplink data scheduling conflict on the same radio resource, then the terminal may determine the target logical channel that needs to perform the data transmitting of each of the plurality of networks first, and then select the network corresponding to the target logical channel with the highest QCI as the second target network. Through the above process, the network corresponding to the target logical channel with the highest QCI may be selected as the second target network when the plurality of networks have the uplink data scheduling conflict on the same radio resource, so that the service transmission quality is ensured, and the availability is high.

In the embodiments of the disclosure, the highest QCI of all logical channels included in each network may be taken as the target service class identifier of each network by the terminal if the plurality of networks have a downlink data scheduling conflict on the same radio resource, and further, the network with the highest target service class identifier is taken as the second target network. Through the above process, the network with the highest target service class identifier may be selected as the second target network when the plurality of networks have the downlink data scheduling conflict on the same radio resource, so that the service transmission quality is ensured, and the availability is high.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for determining a radio resource, applied to a terminal supporting a plurality of Subscriber Identification Module (SIM) cards belonging to different operators, and comprising:
   determining, from a plurality of networks by a user, a network used for data scheduling in an event of a subsequent data scheduling conflict; and taking the network determined by the user as a first target network by the terminal;
   determining a second target network from the plurality of networks in response to determining that the plurality of networks have a data scheduling conflict on a same radio resource,
   wherein the determining the second target network from the plurality of networks comprises:
   determining the second target network from the plurality of networks according to a Quality of Service (QoS) Class Identifier (QCI) of a logical channel included in each of the plurality of networks, wherein a QCI of a target logical channel, in the second target network, that needs to perform data transmitting is highest, or a target service class identifier of the second target network is the highest, the target service class identifier being a highest QCI of all logical channels included in the second target network; and
   performing data scheduling on a radio resource of the first target network and the second target network in response to determining that the plurality of networks have a data scheduling conflict on a same radio resource, wherein the radio resource comprises at least one of a time domain resource, a frequency domain resource, or a beam resource.

2. The method of claim 1, wherein in response to determining that the plurality of networks have an uplink data scheduling conflict on the same radio resource, the determining the second target network from the plurality of networks according to the QCI of the logical channel included in each of the plurality of networks comprises:
   determining a target logical channel that needs to perform data transmitting of each of the plurality of networks; and
   taking a network corresponding to the target logical channel with the highest QCI as the second target network.

3. The method of claim 1, wherein in response to determining that the plurality of networks have a downlink data scheduling conflict on the same radio resource, the determining the second target network from the plurality of networks according to the QCI of the logical channel included in each of the plurality of networks comprises:
   taking the highest QCI of all logical channels included in each of the plurality of networks as a target service class identifier corresponding to each of the plurality of networks; and
   taking the network with the highest target service class identifier as the second target network.

4. An apparatus for determining a radio resource, wherein the apparatus is a terminal supporting a plurality of Subscriber Identification Module (SIM) cards belonging to different operators, and comprises:
   a processor; and
   a memory configured to store instructions executable by the processor;
   wherein the processor is configured to perform operations of:
   determining, from a plurality of networks by a user, a network used for data scheduling in an event of a subsequent data scheduling conflict; and taking the network determined by the user as a first target network by the terminal;
   determining a second target network from the plurality of networks in response to determining that the plurality of networks have a data scheduling conflict on a same radio resource, wherein the determining the second target network from the plurality of networks comprises: determining the second target network from the plurality of networks according to a Quality of Service (QoS) Class Identifier (QCI) of a logical channel included in each of the plurality of networks, wherein a QCI of a target logical channel, in the second target network, that needs to perform data transmitting is highest, or a target service class identifier of the second target network is the highest, the target service class identifier being a highest QCI of all logical channels included in the second target network; and
   performing data scheduling on a radio resource of the first target network and the second target network in response to determining that the plurality of networks have a data scheduling conflict on a same radio resource, wherein the radio resource comprises at least one of a time domain resource, a frequency domain resource, or a beam resource.

5. The apparatus of claim 4, wherein in response to determining that the plurality of networks have an uplink data scheduling conflict on the same radio resource, the determining the second target network from the plurality of networks according to the QCI of the logical channel included in each of the plurality of networks comprises:
- determining a target logical channel that needs to perform data transmitting of each of the plurality of networks; and
- taking a network corresponding to the target logical channel with the highest QCI as the second target network.

6. The apparatus of claim 4, wherein in response to determining that the plurality of networks have a downlink data scheduling conflict on the same radio resource, the determining the second target network from the plurality of networks according to the QCI of the logical channel included in each of the plurality of networks comprises:
- taking the highest QCI of all logical channels included in each of the plurality of networks as a target service class identifier corresponding to each of the plurality of networks; and
- taking the network with the highest target service class identifier as the second target network.

* * * * *